United States Patent [19]

Shimada et al.

[11] Patent Number: 4,771,296

[45] Date of Patent: Sep. 13, 1988

[54] TRANSFER RIBBON FEED ARRANGEMENT

[75] Inventors: Mitsuhiro Shimada, Nara; Yuichiro Mori, Yamatokoriyama; Fumio Shiozaki, Tenri; Susumu Nonaka; Takashi Imagawa, both of Yamatokoriyama, all of Japan

[73] Assignee: Sharp Kabushiki Kaisha, Osaka, Japan

[21] Appl. No.: 920,161

[22] Filed: Oct. 17, 1986

[30] Foreign Application Priority Data

Oct. 18, 1985 [JP] Japan ................................ 60-232843
Dec. 26, 1985 [JP] Japan ................................ 60-293939

[51] Int. Cl.$^4$ ......................... G01D 15/10; B41J 33/02

[52] U.S. Cl. ................................ 346/76 PH; 346/136; 400/120; 400/234; 400/240; 400/240.3

[58] Field of Search ...................... 346/1.1, 76 PH, 46, 346/136; 400/120, 208, 234, 240.4, 240.3, 240, 216.1, 235.1; 430/348, 293

[56] References Cited

U.S. PATENT DOCUMENTS 4,499,476 2/1985 Inui et al. ....................... 346/76 PH
4,521,125 6/1985 Turbon ................................ 400/208

FOREIGN PATENT DOCUMENTS 0147911 7/1985 European Pat. Off. .
2150502 7/1985 United Kingdom .

OTHER PUBLICATIONS

I.B.M. Technical Disclosure Bulletin, vol. 18, No. 4, Sep. 1975, p. 1093, "Ribbon Drag Wire", by E. J. Lenney.

I.B.M. Technical Disclosure Bulletin, vol. 23, No. 10, Mar. 1981, pp. 4553–4554, "Compressible Ribbon Roller for Constant Tension", by J. A. Craft.

*Primary Examiner*—E. A. Goldberg
*Assistant Examiner*—Gerald E. Preston
*Attorney, Agent, or Firm*—Birch, Stewart, Kolasch & Birch

[57] ABSTRACT

A trånsfer ribbon feed arrangement for use in a transfer type recording apparatus which transfers onto a recording sheet by sequentially feeding the transfer ribbon includes a feed roller disposed on the feed side of the transfer ribbon for feeding the transfer ribbon from the feed roller, a take-up roller for winding up the transfer ribbon around it and a tension unit disposed on the feed side of the transfer ribbon for applying a constant load on the transfer ribbon to keep it under a constant tension.

7 Claims, 4 Drawing Sheets

TRANSFER RIBBON FEED ARRANGEMENT

BACKGROUND OF THE INVENTION

The present invention generally relates to a transfer ribbon feed means and more particularly, to a transfer ribbon feed arrangement including a transfer ribbon tension unit, which is employed, for example, in a thermal transfer type recording apparatus.

Conventionally, in a thermal transfer type recording apparatus, for example, a thermal transfer printer employing a transfer ribbon such as inked ribbon therein, wrinkles of the ribbon, shears in printing or the like have been prevented in a manner wherein tension is applied to the transfer ribbon by winding it around a take-up roller connected to a driving source, with friction being applied by a shaft of a transfer ribbon feed roller.

Furthermore, with respect to a colored transfer ribbon, the color of each colored layer or the position thereof has been detected in a manner wherein markers are formed on the colored transfer ribbon at the portions subjected to no interference from printing and these markers are detected by an optical detecting means such as a photosensor composed of a light emitting diode and a phototransistor.

However, the transfer ribbon which is would around the feed roller and is rolled around the take-up roller has roll diameters which vary with the transportation thereof, and the tension applied on the transfer ribbon cannot be kept constant. Accordingly, wrinkles occur in the transfer ribbon, and shears or the like in printing still disadvantageously taken place.

In addition, the color of each colored layer or the position thereof has not been clearly detected in some cases due to an improper positioning of any colored layer of the colored transfer ribbon which results from a slackening of the ribbon or the like.

SUMMARY OF THE INVENTION

Accordingly, the present invention has been developed with a view to substantially eliminating the above described disadvantages inherent in the prior art transfer type recording apparatus, and has for its essential object to provide an improved transfer type recording apparatus having a ribbon tensioning means in a ribbon feed arrangement thereof which is capable of preventing wrinkles of a transfer ribbon and preventing undesirable shears in printing or the like.

Another important object of the present invention is to provide a transfer type recording apparatus of the above described type which is capable of clearly detecting the color of each colored layer of a colored transfer ribbon or the position thereof, with simple markers being formed on a limited space of the colored transfer ribbon.

In accomplishing these and other objects, according to one preferred embodiment of the present invention, there is provided a transfer ribbon feed arrangement for use in a transfer type recording apparatus having a function for transferring onto a recording sheet by sequentially feeding the transfer ribbon, said feed arrangement including a feed roller disposed on the feed side of the transfer ribbon for feeding the transfer ribbon therefrom, a take-up roller for winding up the transfer ribbon therearound and a tensioning means disposed on the feed side of the transfer ribbon for applying a constant load thereon to keep the transfer ribbon under a constant tension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and which are given by way of illustration only, and thus are not limitative of the present invention, and in which.

DETAILED DESCRIPTION OF THE PREFERRED EMBODIMENT

Figure 1:
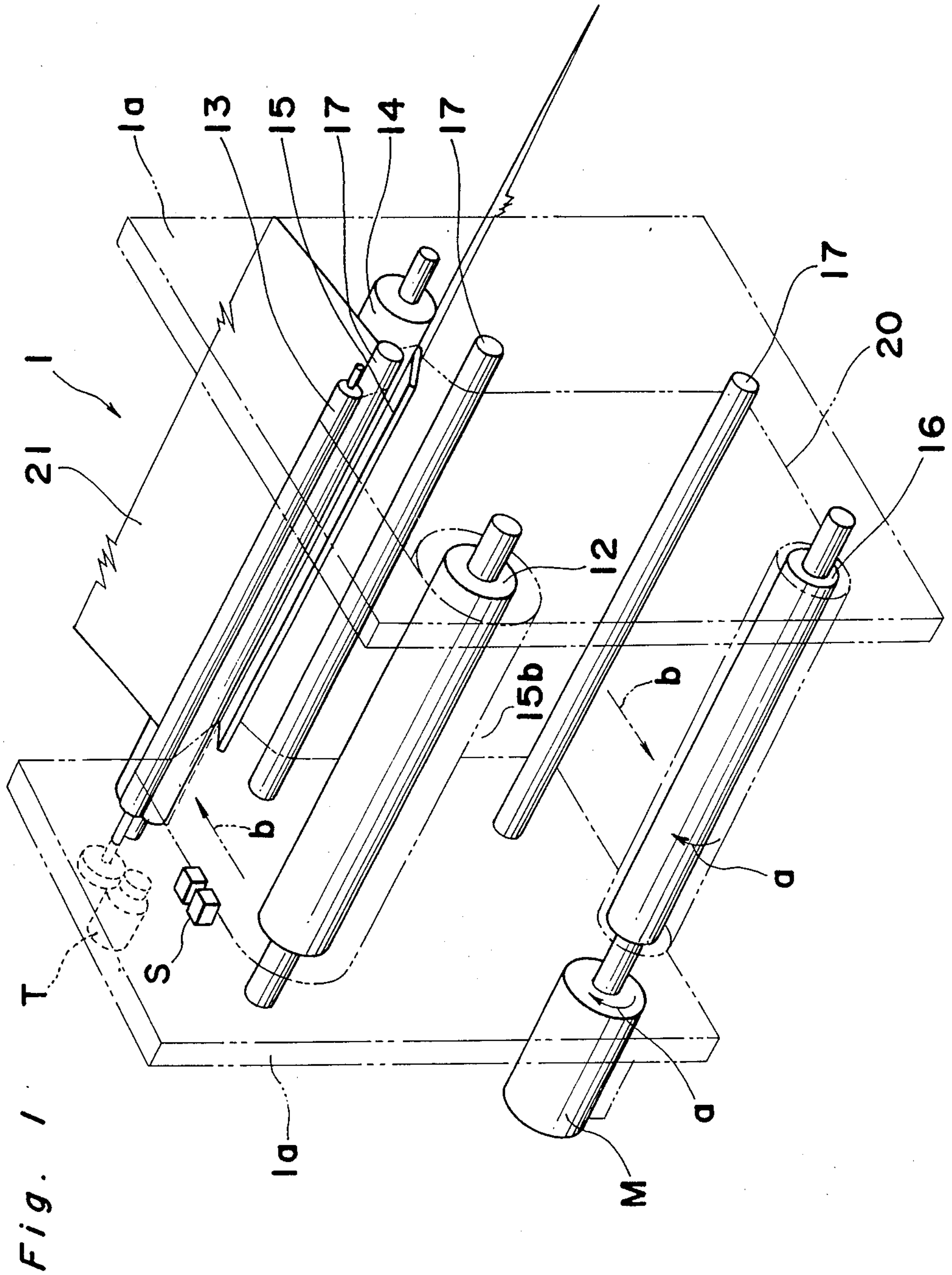
FIG. 1 is a perspective view of a thermal transfer printer having a ribbon tensioning means in a ribbon feed arrangement thereof according to one preferred embodiment of the present invention.
Figure 2:
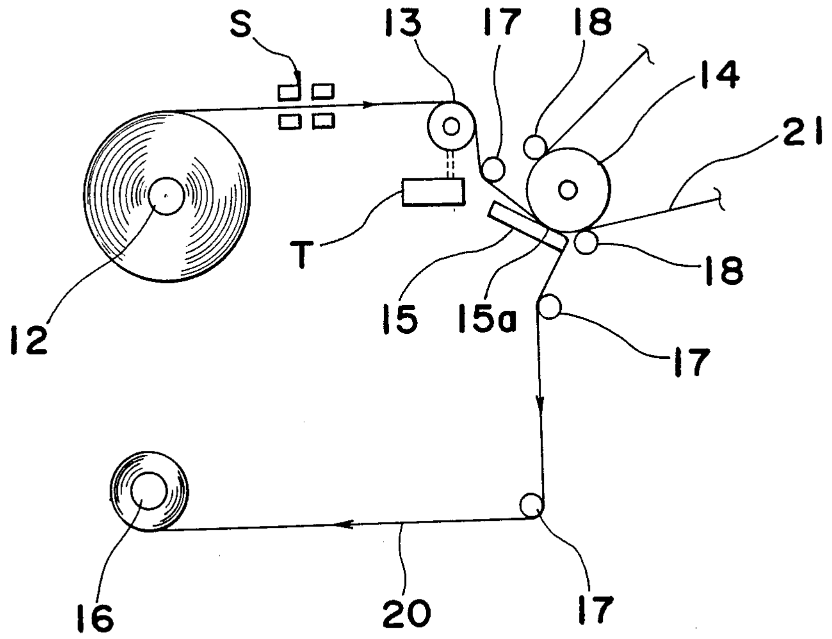
FIG. 2 is a schematic diagram showing the construction of FIG. 1.

Referring now to the drawings, FIGS. 1 and 2 illustrate a thermal transfer type recording apparatus 1 having a ribbon tensioning means in a ribbon feed arrangement thereof according to one preferred embodiment of the present invention. The thermal transfer type recording apparatus 1 of FIGS. 1 and 2 is provided with a feed roller 12, a tension roller 13, a platen roller 14, a thermal print head 15 and a take-up roller 16. These elements are arranged from an upstream side toward downstream a side thereof in a direction in which a transfer medium such as a transfer ribbon 20 is fed, as shown by an arrow (b) in FIG. 1. Each of the rollers 12, 13, 14 and 16 is freely rotatably disposed between a pair of frames 1*a* of the apparatus 1. A plurality of ribbon guides 17 are also disposed at proper positions in the apparatus 1 for guiding the transfer ribbon 20 fed from the feed roller 12. Furthermore, as shown in FIG. 2, a pair of sheet press rollers 18 are so disposed as to be held in pressure contact with the platen roller 14, for transporting a recording sheet 21 by both of the sheet press rollers 18 and the platen roller 14. In the thermal transfer type recording apparatus 1, the thermal print head 15 is disposed in face-to-face relation to the platen roller 14, for heat transferring the transfer ribbon 20 heated by a line of heating elements 15*a* disposed in the thermal print head 15 onto the recording sheet 21 for printing when the transfer ribbon 20 engages the recording sheet 21 in pressure contact with the platen roller 14.

The transfer ribbon 20 is wound around the feed roller 12, while a thermal melting type pigmented material is spread on the transfer ribbon 20 on one surface thereof facing the recording sheet 21. The transfer ribbon 20 is rolled around a take-up roller 16 which is, as a take-up means, rotatably driven in a direction as shown by an arrow (a) by a motor M or the like. This roller 16 is synchronously driven at the feed speed of the recording sheet 21 by way of a space between the platen roller 14 and the thermal print head 15.

The recording sheet 21 is fed from another feed roller (not shown) freely rotatably disposed on the upper rear side of the apparatus 1 and is transfer-printed thereon through the platen roller 14 and thereafter, the recording sheet 21 is rolled around another take-up roller (not shown) which is also freely rotatably mounted on the lower rear side of the apparatus 1 and is driven by a motor or the like.

In the ribbon feed arrangement of the transfer type recording apparatus 1 having the above described construction, the tension roller 13 disposed on the upstream side of the apparatus 1 from which the transfer ribbon 20 is supplied, is provided with a surface layer formed of an elastic material such as rubber or the like having a large friction coefficient. A torque limiter T such as TRQ-LMT (Trade Mark owned by a Japanese Company "NIPPO") is disposed so as to apply a predetermined load to the tension roller 13, with the transfer ribbon 20 being wound up under a constant tension by the take-up roller 16 therearound.

In order to wind up the transfer ribbon 20 under a constant tension by the take-up roller 16, the number of revolutions and the rotational torque of the take-up roller 16 must be in inverse proportion to each other. Accordingly, it is so designed as to be capable of winding up the transfer ribbon 20 under the constant tension by connecting the take-up roller 16, for example, to a driving source (not shown) which selectively employs therein a gear ratio by which a torque curve having a relationship approximately similar to that of the aforementioned inverse proportion can be obtained.

In this embodiment, although the torque limiter T is employed for applying the constant load to the tension roller 13, the present invention is not limited thereby and any loader which can give the constant load may be replaced by the torque limiter T.

Subsequently, the thermal transfer type recording apparatus 1 having the above described construction will be described hereinafter.

The transfer ribbon 20 supplied from the feed roller 12 is applied with the constant load by the tension roller 13 connected to the torque limiter T, and is simultaneously wound up by the take-up roller 16 therearound under the constant tension, thus resulting in the transfer ribbon 20 being in a state of constant tension at all times. The transfer ribbon 20 receiving the constant tension thereon is inserted, together with the recording sheet 21, between the platen roller 14 and the thermal print head 15 through the ribbon guide 17, and upon completion of the printing on the recording sheet 21 by the thermal print head 15, the transfer ribbon 20 is rolled around the take-up roller 16 thereby through the ribbon guides 17. In the above described manner, the transfer ribbon 20 can travel synchronously with the recording sheet 21 and the tension applied on the transfer ribbon 20 can be stabilized.

Figure 3:
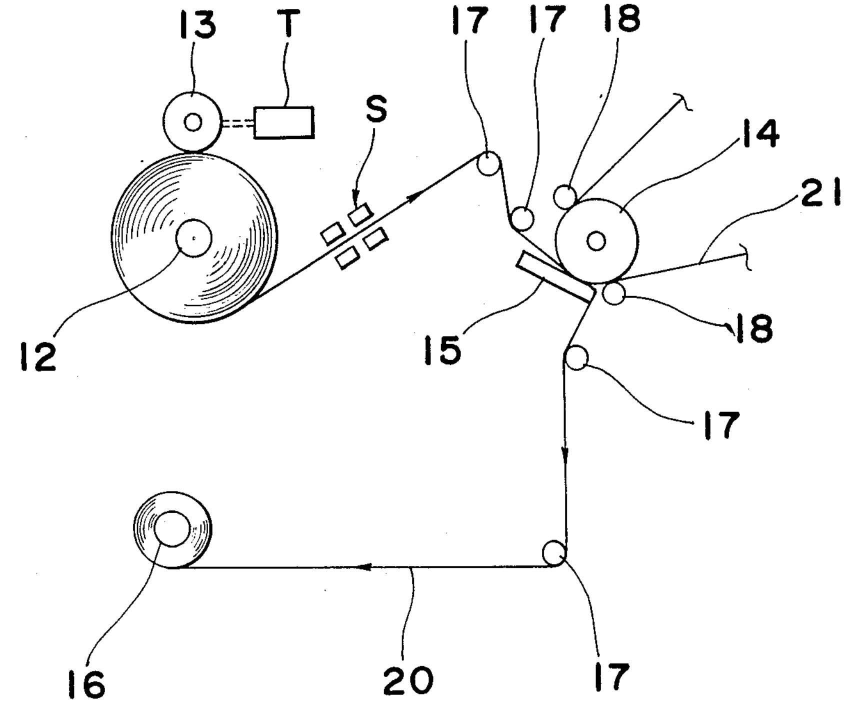
FIG. 3 is a schematic diagram showing the construction of a thermal transfer printer having a ribbon tensioning means in a ribbon feed arrangement thereof according to another embodiment of the present invention.

FIG. 3 schematically illustrates the thermal transfer type recording apparatus 1 having the ribbon tensioning means therein according to another embodiment of the present invention. In FIG. 3, the ribbon feed arrangement of the apparatus 1 having the ribbon tensioning means therein is so constructed that the tension roller 13 connected to the torque limiter T is held in direct contact with the outer peripheral surface of the feed roller 12. Also, the tension roller 13 is adequately pressed against the feed roller 12 by a weight or the like so as to follow the inconstant diameter of the feed roller 12. The construction other than the above described one is the same as that of the ribbon feed arrangement as shown in FIGS. 1 and 2.

A color thermal transfer printer to which the present invention is applied, will be explained hereinafter.

A colored transfer ribbon 20 and the recording sheet 21 are held in pressure contact with each other between the platen roller 14 and the thermal print head 15, and colored ink of the colored transfer ribbon 20 is heated by a line of heating elements 15*a* and is printed on the recording sheet 21 by being heat transferred. Although the recording sheet 21 is firstly transported by the platen roller 14 and the pair of the sheet press rollers 18 in the feed direction of the recording sheet 21, it is further transported in a direction opposite to the feed direction thereof every time the transfer of one of the inked layers is completed in the transfer for one page and as a result, the recording sheet 21 is reciprocated by the number of the inked layers formed in a group thereof corresponding to one page. On the other hand, the colored transfer ribbon 20 supplied in turn from the feed roller 12 is guided by the ribbon guides 17 and is wound up by the take-up roller 16 therearound after completion of the transfer. An optical detecting means S is disposed in a position on the feed side of the colored transfer ribbon 20 with respect to the thermal print head 15, for detecting the color and the transfer position of the colored transfer ribbon 20. The optical detecting means S is not necessarily required to be placed at the transfer position facing the line of the heating elements 15*a*, but may be arranged at any position where it is easily placed, by adequately selecting the marking positions of the colored transfer ribbon 20 in accordance with the positional relationship between the line of the heating elements 15*a* and the optical detecting means S, or by electrically and adequately setting the feed length of the colored transfer ribbon 20.

Figure 4:
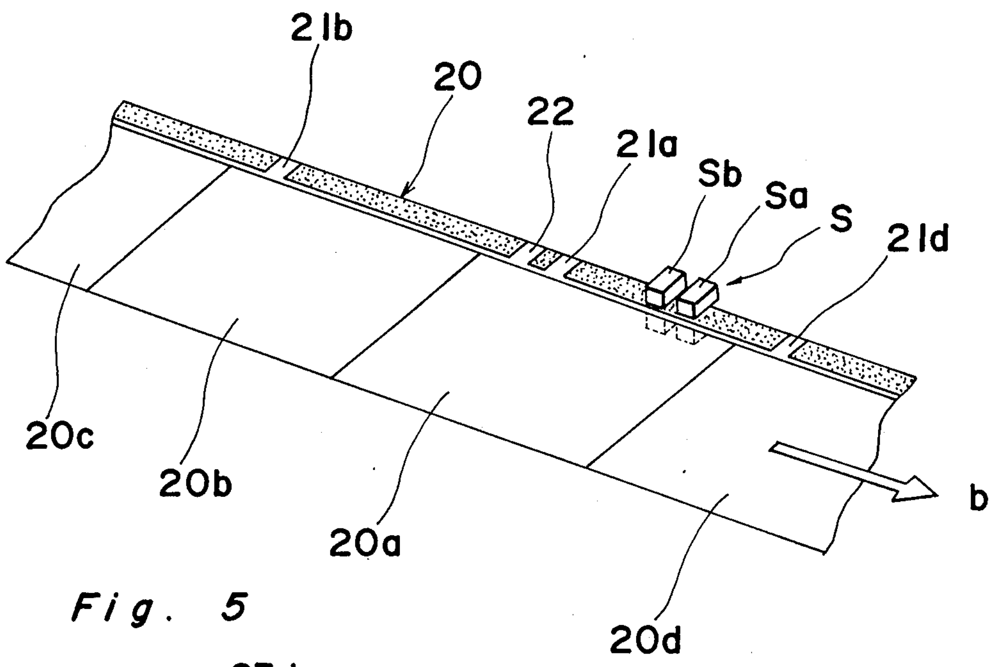
FIG. 4 is a perspective view of a portion of a colored transfer ribbon and sensors of FIG. 1.
Figure 5:
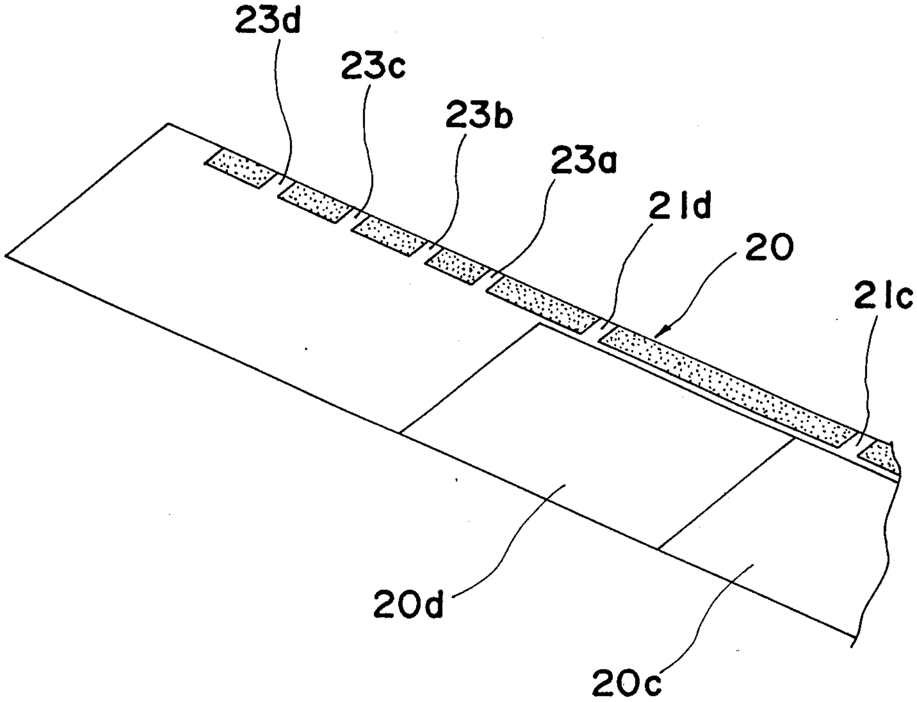
FIG. 5 is a perspective view of a trailing end portion of the colored transfer ribbon of FIG. 4.

FIG. 4 illustrates a portion of the colored transfer ribbon 20 and the optical detecting means S, and FIG. 5 illustrates the trailing end portion of the colored transfer ribbon 20 of FIG. 4.

As shown in FIG. 4, the color-inked layers 20*a* to 20*d* in the order of yellow, magenta, cyan and black with respect to the feed direction of the ribbon 20 as shown by an arrow (b) are formed on the colored transfer ribbon 20 so as to successively form a group of the inked layers corresponding to one page of the recording sheet 21. The marking portions are formed at an edge portion on one side of the colored transfer ribbon 20 in a lengthwise direction thereof. Both positioning markers 21*a* to 21*d* are marked on the ribbon 20 in alignment with the respective color-inked layers 20*a* to 20*d* in each group as well as a cuing marker 22 which is marked on the ribbon 20 in the vicinity of the positioning marker 21*a* in alignment with the yellow inked layer 20*a* positioned firstly in a group of the inked layers 20*a* to 20*d*. Each of the positioning markers 21*a* to 21*d* is so formed as to face the first sensor Sa, when the leading end portion of respective inked layers 20*a* to 20*d* has arrived at the transfer position facing the line of the heating elements 15*a*. Each of the first and second sensors Sa and Sb forming the optical detecting means S is composed of a photosensor comprising a light emitting diode and a phototransistor disposed on respective surfaces of the ribbon 20 so as to face each other. Both of the sensors Sa and Sb are so positioned that the distance therebetween coincides with that between the positioning marker 21*a* and the cuing marker 22 corresponding to the first yellow inked layer 20*a*.

In the case of the transfer onto the recording sheet 21, when the colored transfer ribbon 20 is brought to a halt at the time when both of the markers 21*a* and 22 are simultaneously detected by both of the sensors Sa and Sb, the leading end portion of the yellow inked layer 20*a* positioned firstly in the group of the inked layers 20*a* to 20*d* comes to face the line of the heating elements 15*a*. Thereafter, the recording sheet 21 is supplied by a certain constant pitch, while the line of the heating elements 15*a* is heated in accordance with print signals, and the yellow ink of the yellow inked layer 20*a* is melted thereby being transferred onto the recording sheet 21. Upon completion of the transfer of the yellow ink for a corresponding page, the recording sheet 21 is transported back to the original positon, while the colored transfer ribbon 20 is caused to run idle. Thereafter, when the positioning marker 21*b* corresponding to the second magenta inked layer 20*b* is detected by the first sensor Sa, the ribbon 20 is brought to a halt and the magenta ink is transferred onto the recording sheet 21. In the same manner as described above, when the cyan ink and the black ink are sequentially transferred onto the recording sheet 21, the transfer for one page is completed and the ribbon 20 is further fed.

During the printing operation as described above, since all of the inked layers 20*a* to 20*d* are sequentially formed in the predetermined order, the color of each layer is judged by the number of the positioning markers 21*a* to 21*d* to be detected which have been counted by the first sensor Sa. Accordingly, for example, when a print signal for the cyan ink is not outputted, the colored transfer ribbon 20 is not brought to a halt, but continues being transported at the time the third positioning marker 21*c* is detected and thereafter, the color-inked ribbon 20 is brought to a halt at the time the fourth positioning marker 21*d* is detected.

At the trailing end portion of the colored transfer ribbon 20, there are formed as many end markers 23*a* to 23*d* as there are inked layers 20*a* to 20*d* composing one group of the inked layers. The end markers are next to the last black inked layer 20*d*, and the distance between adjacent end markers 23*a* to 23*d* is determined to be longer than that between both sensors Sa and Sb and to be shorter than that between adjacent positioning markers 21*a* to 21*d*. Accordingly, since the black inked layer 20*d* is followed by the yellow inked layer 20*a* at the portions other than the trailing end portion of the ribbon 20, the markers 21*a* and 22 are to be detected simultaneously by both of the sensors Sa and Sb at the aforementioned portions. Notwithstanding this fact, when both of the sensors Sa and Sb are not simultaneously turned on, it is judged that the trailing end portion of the colored transfer ribbon 20 has been detected. Hereupon, if only one end marker is formed next to the black inked layer 20*d* and the detection of the trailing end portion of the ribbon 20 is judged by detecting one end marker after the black inked layer 20*d* has been detected, possible erroneous operation as to judge the detection of the trailing end portion of the ribbon 20 may undesirably take place in the case where either one of the markers 21*a* and 22 of the yellow inked layer 20*a* has been only detected in the intermediate portion of the ribbon 20 for some reason or other. In order to avoid the aforementioned drawback, there are formed four end markers 23*a* to 23*d* at the trailing end portion of the colored transfer ribbon 20.

Figure 6:
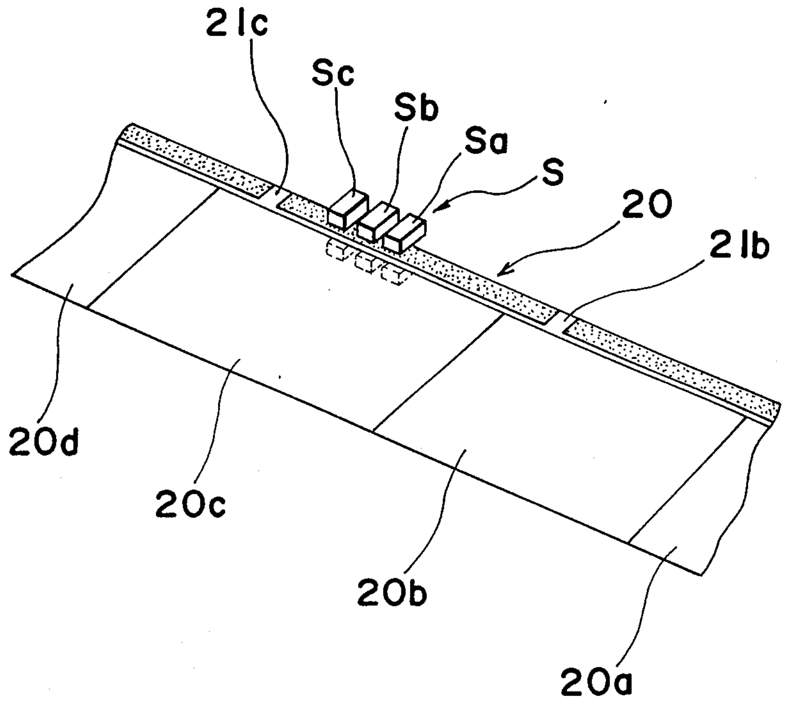
FIG. 6 is a perspective view of the colored transfer ribbon and the sensors which particularly shows a modification thereof.

A detecting means as shown in FIG. 6 may be employed for detecting the trailing end portion of the colored transfer ribbon 20. More specifically, there may be disposed an additional third sensor Sc in the vicinity of the first and second sensors Sa and Sb, and three end markers may be formed in a manner that the distance between adjacent markers is caused to coincide with that between adjacent sensors Sa to Sc at the trailing end portion of the colored transfer ribbon 20. In such a manner, all three of the sensors Sa to Sc are simultaneously turned on only when three end markers have been simultaneously detected or when the colored transfer ribbon 20 has not been set. Thus a state where the colored transfer ribbon 20 is not set can also be detected and as a result, the operation of the printer can be avoided in the aforementioned state. However, this operation has disadvantageous in that a new ribbon must be set in a manner that the leading tape portion thereof is not left at the position where each of the sensors faces the ribbon, since all of the sensors are erroneously turned on, when the leading tape portion of the ribbon faces each of the sensors Sa to Sc in the case where a used ribbon is replaced by a new one. Accordingly, provided that a marking is formed on the leading tape portion of the ribbon, the aforementioned disadvantage can be preferably eliminated and in addition, not only can any possible slackening or damage of the ribbon be effectively avoided, but also the ribbon can be easily handled by forming the leading tape portion to be of a thickness of approximately 20 $\mu$m in order to cause it to be thicker than the ribbon.

In the above described embodiment of the colored transfer ribbon, each of the markers 21*a* to 21*d*, 22 and 23*a* to 23*d* is formed on the ribbon in a light transmitting mode. On the contrary, if each of them is formed in a light screening mode, since a black ink is spread only on the portions where each of the markers 21*a* to 21*d*, 22 and 23*a* to 23*d* is formed, there arises such a drawback that the colored transfer ribbon 20 is loosely wound up in a rolled state due to an increased amount of ink only in the marked portions. When each of the markers 21*a* to 21*d*, 22 and 23*a* to 23*d* is formed in the light transmitting mode as described above, the black ink is spread along most of the edge portion of the colored transfer ribbon 20 in areas other than the markers 21*a* to 21*d*, 22 and 23*a* to 23*d*. Thus, this arrangement effectively handles the ribbon 20, since any scantling thereof can be substantially eliminated due to the fact that the amount of the ink spread on the edge portion of the ribbon 20 is approximately the as same as that spread on the inked layers 20*a* to 20*d*.

In any example of the colored transfer ribbon described so far, the distance between adjacent markers should be kept constant for the purpose of proper detection thereof by the optical detecting means. Such a state may be achieving by keeping the tension applied on the colored transfer ribbon constant by means of the aforementioned ribbon feed arrangement disposed in the color thermal transfer printer.

Furthermore, each inked layer of the colored transfer ribbon can be properly transferred onto the recording sheet in position without any deviation between printed colors thereon due to the fact that any possible slackening or wrinkles of the colored transfer ribbon can be completely prevented by the ribbon feed arrangement in the color thermal transfer printer.

With respect to the markers formed on the colored transfer ribbon, since the portions to be marked are disposed only on one side of the colored transfer ribbon at the edge portion thereof, a space required for marking has been advantageously reduced, as compared with any conventional arrangements. Accordingly, each of the inked layers can be effectively formed on the colored transfer ribbon. Moreover, since it is satisfactory to form one marker on each of the inked layers other than the first one in each group of the inked layers, the markers can be extremely simply formed on the colored transfer ribbon, thus resulting in the clear detection thereof. In addition to this, the sensors for detecting the markers can be reduced both in number and in cost. Also for detection of the markers, since the inked layers are excluded from the region to be detected, the sensors can be advantageously kept in a high sensitive state at all times.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

We claim:

1. A transfer ribbon feed arrangement for use in a transfer type recording apparatus which transfers ink onto a recording sheet by sequentially feeding said transfer ribbon, said transfer ribbon feed arrangement comprising:

a feed roller for feeding said transfer ribbon therefrom;

a take-up roller for winding up said transfer ribbon therearound; and tensioning means disposed on the feed side of said transfer ribbon for applying a constant load on said transfer ribbon to keep said transfer ribbon under a constant tension, said tensioning means comprising at least a torque limiter for maintaining said constant load.

2. The transfer ribbon feed arrangement as claimed in claim 1, wherein said transfer ribbon has a row of a plurality of groups of color-inked layers formed thereon in a lengthwise direction of said ribbon and also has a cuing marker for each group of the color-inked layers and a plurality of positioning markers for each group of the color-inked layers, said cuing marker being formed on the ribbon in alignment with the leading one of the color-inked layers in each group with respect to the direction of feed of the ribbon, said positioning markers being equal in number to the number of the color-inked layers in each group and being formed on the ribbon in alignment with the respective color-inked layers in each group, and further comprising a sensor means for detecting said cuing marker and said positioning markers.

3. The transfer ribbon feed arrangement as claimed in claim 2, wherein a plurality of end markers of the number at least as same as that of said color-inked layers in one group are formed at the trailing end portion of said colored transfer ribbon in a manner wherein distance between adjacent end markers is longer than distance between said positioning marker and said cuing marker of the first color-inked layer, and is shorter than distance between adjacent positioning markers.

4. The transfer ribbon feed arrangement as claimed in claim 2, wherein said transfer ribbon has opposite side edge portions and wherein said cuing markers and said positioning markers are located along one of the opposite side edge portions of said transfer ribbon.

5. The transfer ribbon feed arrangement as claimed in claim 3, wherein said transfer ribbon has opposite side edge portions and wherein said cuing markers, said positioning markers and said end markers are located along one of the opposite side edge portions of said transfer ribbon.

6. The transfer ribbon feed arrangement as claimed in claim 2, wherein said sensor means comprises a first sensor for detecting said positioning markers in each group one at a time and a second sensor for detecting said cuing marker in each group.

7. The transfer ribbon feed arrangement as claimed in claim 6, wherein said sensor means further comprises a third sensor for simultaneously detecting three end markers in cooperation with said first and second sensors, said end markers being formed at a trailing end portion of said colored transfer ribbon.

* * * * *